United States Patent [19]
Buechele

[11] Patent Number: 5,084,933
[45] Date of Patent: Feb. 4, 1992

[54] ADAPTOR FOR WINDSHIELD WIPER ARMS

[76] Inventor: Franz Buechele, 501 Lake Rd., Lawrenceburg, Tenn. 38464

[21] Appl. No.: 600,364

[22] Filed: Oct. 19, 1990

[51] Int. Cl.$^5$ .................................................. B60S 1/40
[52] U.S. Cl. ................................ 15/250.32; 15/250.42
[58] Field of Search ............ 15/250.32, 250.31, 250.42, 15/250.35, 250.36

[56] References Cited

U.S. PATENT DOCUMENTS

| | | | |
|---|---|---|---|
| 3,928,887 | 12/1975 | Lopez et al. | 15/250.32 |
| 3,961,394 | 6/1976 | Steger | 15/250.32 |
| 4,023,232 | 5/1977 | Smithers | 15/250.32 |
| 4,057,869 | 11/1977 | Longman et al. | 15/250.32 |
| 4,094,039 | 6/1978 | Waterman et al. | 15/250.32 |
| 4,118,825 | 10/1978 | Hoebrechts et al. | 15/250.32 |
| 4,120,069 | 10/1978 | Sharp et al. | 15/250.32 |
| 4,195,382 | 4/1980 | Macpherson | 15/250.32 |
| 4,214,343 | 7/1980 | Dudek | 15/250.32 |
| 4,224,001 | 9/1982 | Arndt et al. | 15/250 |
| 4,290,164 | 9/1981 | van den Berg | 15/250.32 |
| 4,296,520 | 10/1981 | Arndt | 15/250.32 |
| 4,308,635 | 1/1982 | Maiocco | 15/250.32 |
| 4,321,725 | 3/1982 | Journee | 15/250.32 |
| 4,324,019 | 4/1982 | Mohnach et al. | 15/250.32 |
| 4,327,458 | 5/1982 | Maiocco | 15/250.32 |
| 4,343,062 | 8/1982 | van den Berg | 15/250.32 |
| 4,343,064 | 8/1982 | van den Berg et al. | 15/250.32 |
| 4,354,293 | 10/1982 | LeSausse et al. | 15/250.32 |
| 4,370,775 | 2/1983 | van den Berg et al. | 15/250.32 |
| 4,445,249 | 5/1984 | Harbison et al. | 15/250.32 |
| 4,951,343 | 8/1990 | Scorsiroli | 15/250.32 |

FOREIGN PATENT DOCUMENTS

| | | | |
|---|---|---|---|
| 0053960 | 6/1982 | European Pat. Off. | 15/250.32 |
| 2819540 | 11/1978 | Fed. Rep. of Germany | 15/250.32 |
| 2044082 | 10/1980 | United Kingdom | 15/250.32 |
| 2181639 | 4/1987 | United Kingdom | 15/250.32 |

*Primary Examiner*—Harvey C. Hornsby
*Assistant Examiner*—Gary K. Graham
*Attorney, Agent, or Firm*—Rogers & Scott

[57] ABSTRACT

An adaptor having first coupling means adapted to receive and retain the free end of a wiper arm which may be of the side pin, shepherd's crook or bayonet style and second coupling means adapted to secure the adaptor to the primary yoke. The adaptor has transversely spaced walls for insertion between parallel walls of the yoke, and the walls of the adaptor each have a downwardly extending slot for engaging support means extending transversely between the walls of the yoke. The slots have first and second enlargements longitudinally spaced from each other on the slots, the first enlargement being adapted to retain the adaptor on the support means in a pre-assembled position with the adaptor partially inserted in the yoke and the resulting yoke and adaptor assembly adapted to receive the free end of a wiper arm. The second enlargement is adapted to retain the adaptor on the support means in a fully assembled position with the adaptor fully inserted in the yoke and the wiper arm secured to the yoke.

10 Claims, 3 Drawing Sheets

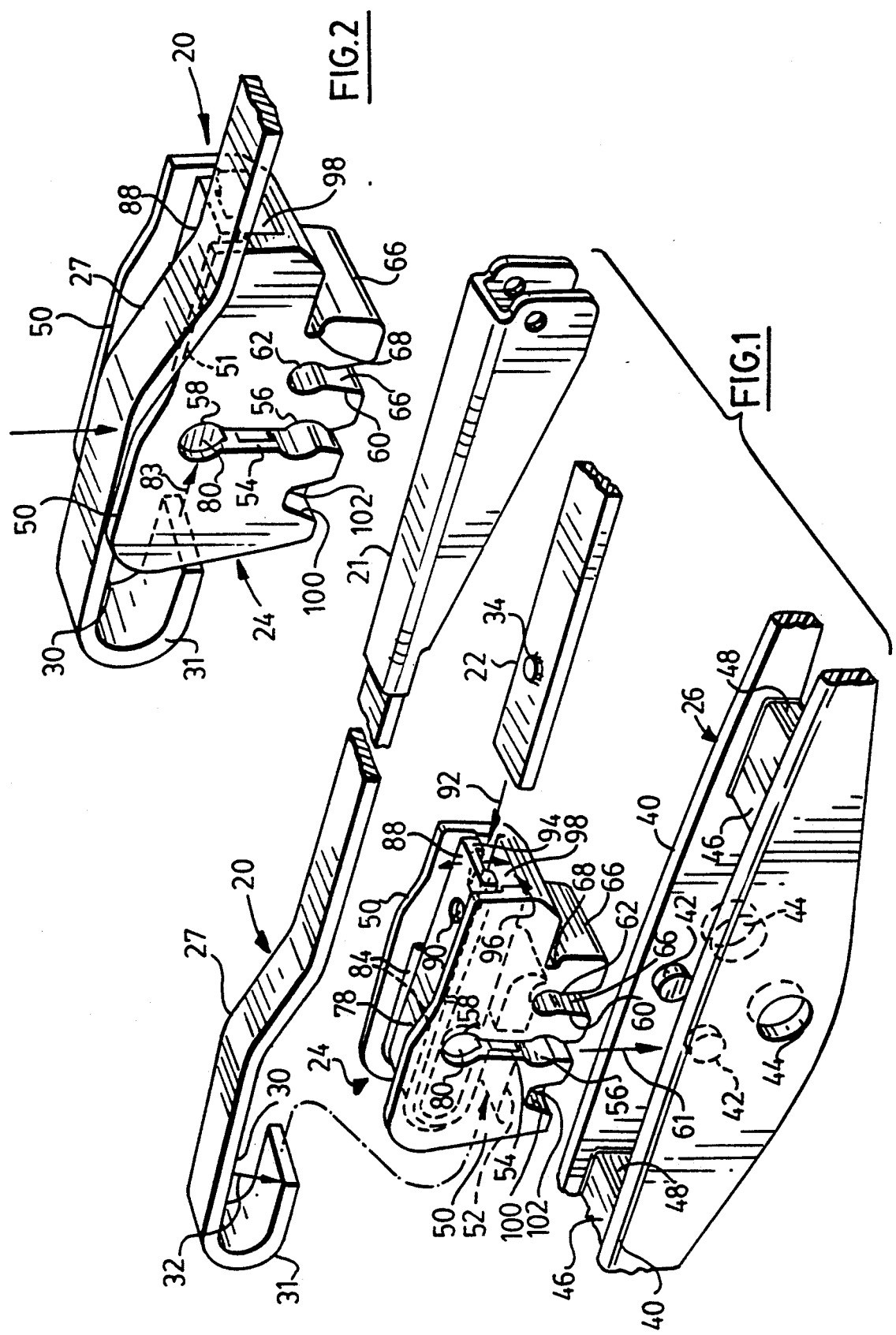

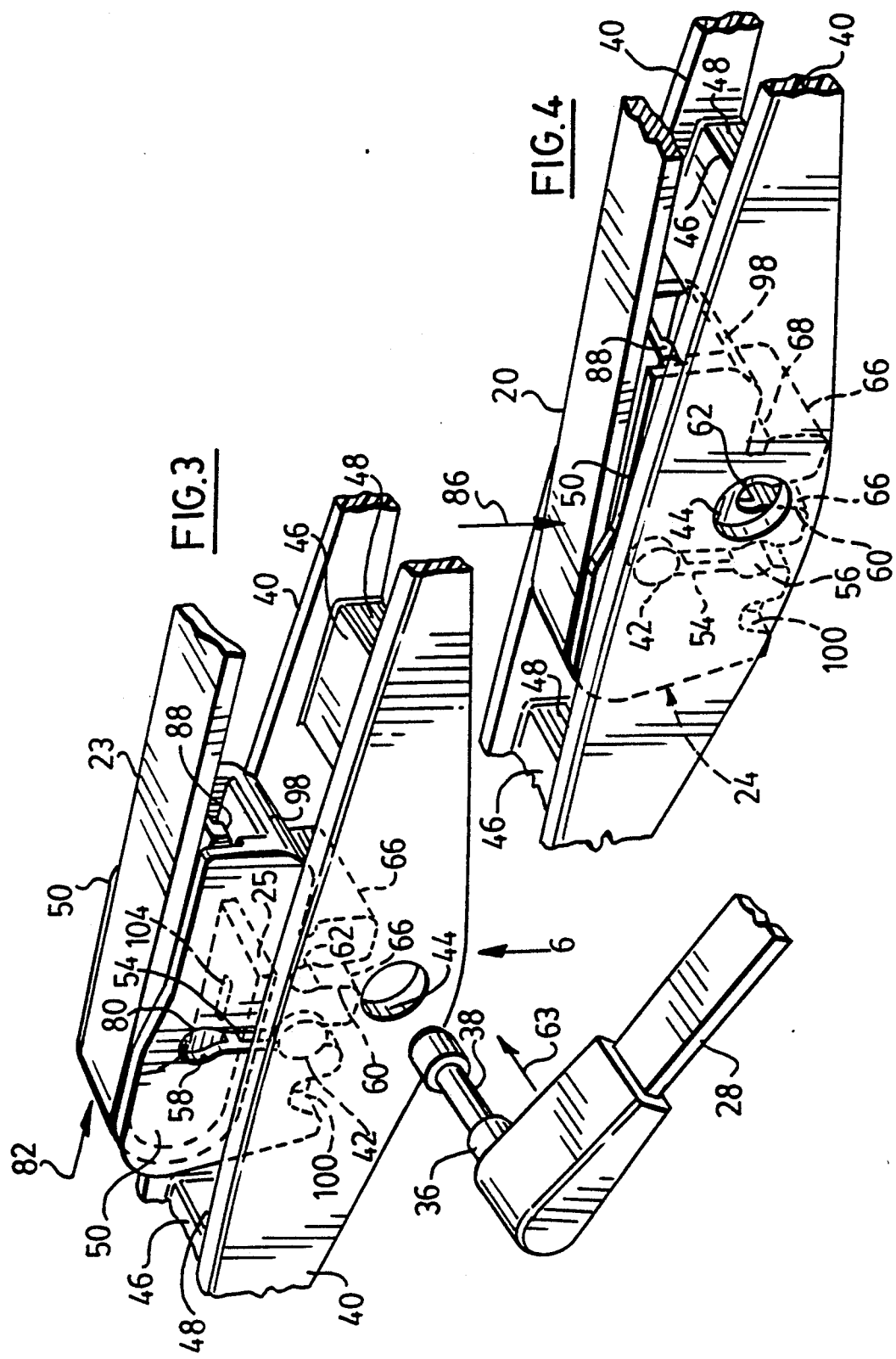

ADAPTOR FOR WINDSHIELD WIPER ARMS

FIELD OF THE INVENTION

This invention relates to an adaptor used to couple a variety of wiper arm styles to the primary yoke of a windshield wiper superstructure.

BACKGROUND OF THE INVENTION

While original equipment manufacturers have the opportunity to select a specific windshield wiper superstructure to cooperate with a preselected wiper arm style, those providing replacement wipers must be able to accomodate a large variety of wiper arm styles and accordingly, adaptors or connectors have been developed for this purpose. Three arm styles known as the bayonet, shepherd's crook and side pin, are very popular but few adaptors have been developed which will accomodate all three styles.

U.S. Pat. No. 4,057,869 shows a connector adapted to cooperate with both the bayonet style arm and the shepherd's crook style arm. The connector body of the structure illustrated in said patent is coupled to the primary yoke of a windshield wiper by means of side panels which straddle the yoke and are secured by a through pin. There exists in the marketplace a modification of this structure wherein the side panels are apertured so as to straddle outwardly extending trunnions provided on the yoke and receive the pin of a side mounted wiper arm. The pin, in this case, is retained in the yoke by a leaf spring assembled within the structure.

An object of this invention is to simplify this structure so as to avoid the requirement to provide a leaf spring with which to engage and secure a side pin style of wiper arm and yet be able to continue to accommodate the aforementioned other arm styles.

An important advantage which flows from the development of this invention is an easy assembly procedure readily adapted for mass production assembly lines.

Another object of the invention is to provide a simpler structure for the adaptor requiring no special retention means to hold the shepherd's crook style of wiper arm in its operative position.

SUMMARY OF THE INVENTION

In accordance with this invention, there is provided an adaptor for coupling a windshield wiper arm to the primary yoke of a windshield wiper superstructure, the primary yoke having a pair of spaced substantially parallel walls on a portion of its length supporting therebetween transversely extending support means adapted to slidably receive the adaptor, the adaptor having first coupling means adapted to receive and retain the free end of a wiper arm and second coupling means adapted to secure the adaptor to the primary yoke, said second coupling means comprising a pair of transversely spaced walls connected by a web extending therebetween, the spacing between the walls of the adaptor being selected to allow the adaptor to be inserted between said parallel walls of the yoke, and the walls of the adaptor each having a first downwardly extending slot whereby the adaptor is adapted to engage said support means upon downward relative movement of the adaptor into the yoke, the first slots each having first and second enlargements longitudinally spaced from each other on said slots, the first enlargement being adapted to retain the adaptor on said support means in a pre-assembled position with the adaptor partially inserted in the yoke and the resulting yoke and adaptor assembly adapted to receive the free end of a wiper arm, and the second enlargement being adapted to retain the adaptor on the support means in a fully assembled position with the adaptor fully inserted in the yoke and the wiper arm secured to the yoke.

BRIEF DESCRIPTION OF THE DRAWINGS

A preferred embodiment of the invention will now be described with reference to the accompanying drawings, in which:

FIG. 1 is a perspective exploded view showing the adaptor according to the invention before assembly onto the primary yoke of a superstructure forming part of the invention and illustrating a first variant of a shepherd's crook and a bayonet style of wiper arm for connection to a primary yoke;

FIG. 2 is a perspective view showing the shepherd's crook style arm of FIG. 1 positioned for assembly on the adaptor;

FIG. 3 is a perspective view showing the adaptor of FIG. 1 in a pre-assembled position in the primary yoke with a second variant of the shepherd's crook style arm secured to the adaptor and a side pin style arm disposed for assembly into the primary yoke;

FIG. 4 is a perspective view showing the adaptor carrying the shepherd's crook style arm of FIG. 3 in the fully assembled position inside the primary yoke;

DESCRIPTION OF THE PREFERRED EMBODIMENT

Figure 5:
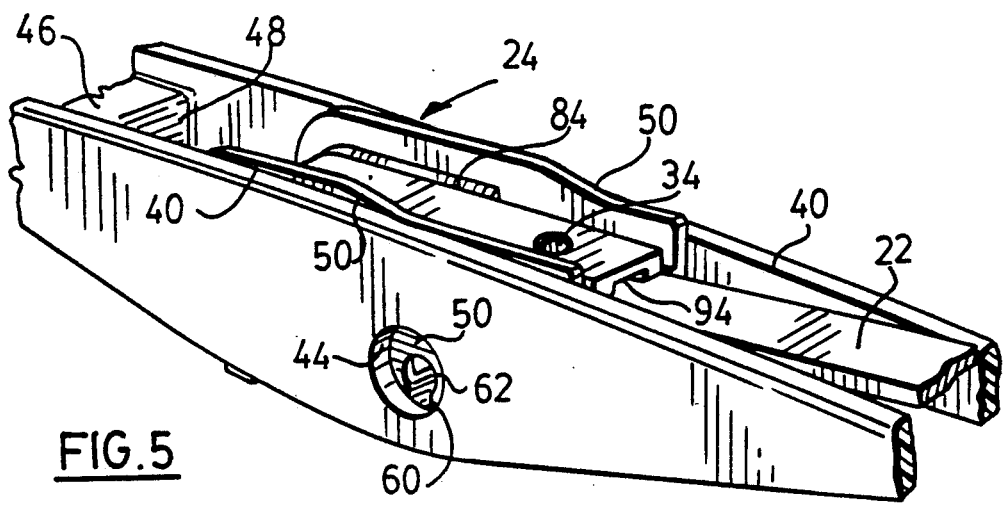
FIG. 5 is a similar view to FIG. 4 with a bayonet style arm attached to the adaptor in its fully assembled position inside the primary yoke.

Referring firstly to FIG. 1, there is illustrated two styles of wiper arms 20, 22 known as the shepherd's crook and bayonet respectively. An adaptor generally indicated by numeral 24 is provided to couple one of the arms 20, 22 to the primary yoke 26 of a windshield wiper superstructure (not shown). The adaptor 24 will also permit the yoke 26 to be coupled to a side pin style of wiper arm (designated by numeral 28 in FIG. 3).

The drawings are illustrative of three popular arm styles: shepherd's crook, bayonet, and side-pin. The shepherd's crook style arm terminates in a U-shaped portion. In a first variant 20 of the shepherd's crook, the legs 30, 31 remote from an arm socket 21 are substantially parallel and separated by a predetermined distance indicated by arrow 32 and nominally assigned the value x. It will be understood that the relative length of the operatively lower leg 31 may vary.

For example, in a second variant 23 of the arm shown in FIG. 3, the operatively lower leg 25 is longer. The first variant 20 also differs from the second variant 23 in that the legs 30, 31 are connected to a main portion of the arm in line with the arm socket 21 by a transverse portion 27 which meets the upper leg 30 at an obtuse angle so as to space the arm from a windshield.

The bayonet style arm 22 comprises a plate of narrow width having an upwardly projecting nib 34 positioned adjacent the end of the arm 22.

The side pin style arm 28 includes a pin 36 which is orthogonal to the arm and has a circumferential groove 38 between its ends.

The primary yoke 26 shown in the drawings has a pair of spaced substantially parallel walls 40 on a portion of its length, usually between ends of the yoke which terminate in spaced flanges adapted for pivotally connecting the yoke to respective secondary yokes (not shown). A support means for the adaptor 24 in the form of axially aligned oppositely directed stubs 42 extend transversely between the walls 40. A pair of oppositely located apertures 44 downwardly and longitudinally spaced from the stubs 42 are formed in the walls 40 and are dimensioned to receive therethrough the pin 36. A pair of transversely extending generally horizontal webs 46 connect the walls 40 and are spaced longitudinally from each other to either side of the stubs 42 so as to accomodate the adaptor 24 therebetween. Downwardly extending webs 48 contiguous with the webs 46 are provided for added strength in this central area of the primary yoke 26.

It will be understood that the adaptor 24 in use locates between the walls 40 of the primary yoke 26 and has first coupling means adapted to receive and retain the free end of a wiper arm and second coupling means to secure the adaptor to the primary yoke.

Like the yoke 26, the adaptor 24 is molded from synthetic plastic material and comprises a pair of transversely spaced walls 50, the spacing between the walls 50 of the adaptor being selected to allow the adaptor to be inserted between the walls 40 of the yoke. In the embodiment illustrated, the walls 50 are connected by several webs extending between the walls some of which have other functions which will be described later. One such web 52 is positioned adjacent the operative bottom of the adaptor 24 (as drawn).

A first downwardly extending slot 54 is provided in each of the walls 50 to define coupling means for securing the adaptor to the primary yoke 26. The slots 54 are closed at the top and are open at the bottom of the adaptor 24 to allow the adaptor to engage the stubs 42 upon downward relative movement of the adaptor into the yoke 26. Each slot 54 also has a first enlargement 56 and a second enlargement 58 longitudinally spaced from each other on the slots, the first enlargement 56 being spaced a short distance from the bottom of the adaptor 24 and the second enlargement 56 being formed at the operatively upper end of the slot, corresponding to pre-assembled and fully assembled positions of the adaptor in the yoke.

Coupling means for connection to the side pin style arm 28 are defined by second downwardly extending slots 60 provided in each side 50 and parallel to the first slots 54. The slots 60 are open at the bottom of the adaptor and terminate in a third enlargement 62 formed in the walls 50. The slots 60 are longitudinally spaced from the first slots 54 by a distance equalling the longitudinal separation between the stubs 42 and the apertures 44 formed in the walls 40 of the primary yoke 26. The third enlargements 62 are spaced from the bottom of the adaptor 24 so that the separation between the enlargements 62 and the apertures 44 in the pre-assembled position of the adaptor will correspond to the separation between the first and second enlargements 56, 58 provided on the first slots 54.

The assembly of the adaptor 24 in the yoke 26 to couple the wiper to the side pin arm 28 will now be described.

To begin, the adaptor 24 is positioned in the pre-assembled position in which the adaptor is partially inserted in the yoke 26 by moving the adaptor downwardly as indicated by arrow 61 relative to the yoke until the stubs 42 locate in the first enlargement 56 of the slots 54 (FIG. 2). In this pre-assembled position of the adaptor, the bottom of the adaptor 24 clears the apertures 44 and thereby allows the side pin 36 to be inserted in the yoke as indicated by arrow 63 with the ends of the pin supported on the walls 40.

The adaptor 24 is then brought to a fully assembled position by pushing downwardly as indicated by arrow 86 (FIG. 4) on the adaptor until the stubs 42 locate in the second enlargement 58 and the ends of the pin 36 locate in the third enlargements 62. Oppositely directed shoulders 64 (FIG. 6) provided on spaced parallel sides 66 extending transversely between the walls 50 of the adaptor and terminating adjacent the second slots 60 locate in the circumferential groove 38 of the pin and thereby restrain any relative transverse movement between the pin 36 and the yoke 26. It will be understood that the sides 66 must flex away from each other upon said downward movement of the adaptor 24 over the pin 36. In order to facilitate the flexing of the sides 66, an undercut 68 is formed in the wall 50 adjacent the second slot 60.

Figure 6:
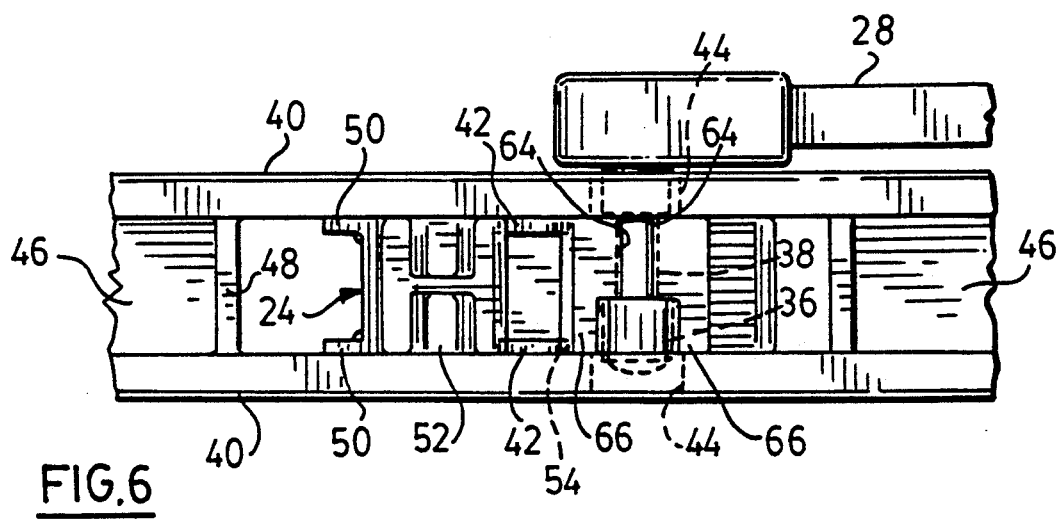
FIG. 6 is a bottom view taken on line 6 of FIG. 3 showing a side pin style arm connected to the adaptor in its fully assembled position.
Figure 7:
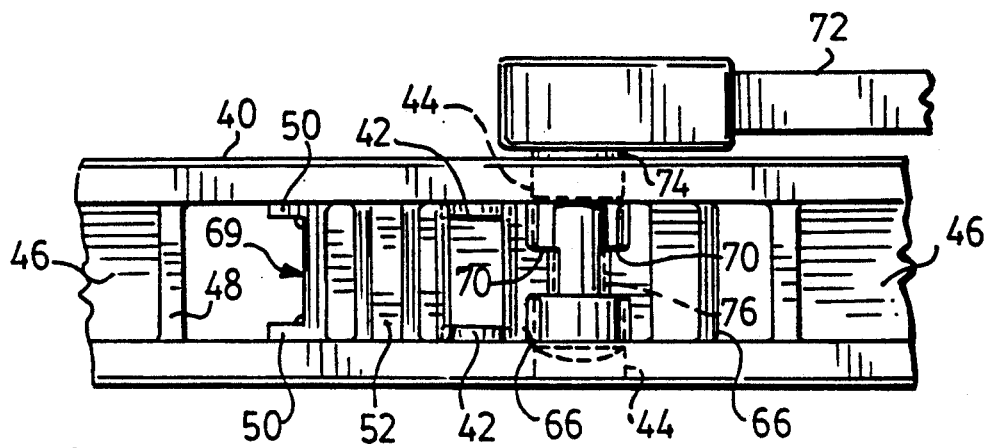
FIG. 7 is a similar view to FIG. 6 showing an alternative embodiment of the adaptor connected to a larger diameter pin comprising a side pin style arm connection.

In FIG. 7, there is shown an alternative embodiment of the adaptor 69 in which the spacing and size of shoulders 70 corresponding to the shoulders 64 of the first embodiment illustrated in FIGS. 1-5 are provided to locate in a side pin arm 72 of which the side pin 74 has a larger diameter and accordingly has a groove 76 which locates between the sides 50 of the adaptor whereas in the first embodiment shown in FIG. 6 the groove 38 locates adjacent one side 50 of the adaptor. As all other components are the same in the second embodiment, they are numbered with like numerals in FIG. 7.

The remaining portions of the adaptor 24 provided for coupling the primary yoke 26 to a shepherd's crook style of wiper arm will now be described with reference being made once more to FIG. 1.

Substantially parallel upper and lower abutment surfaces 78, 80 upwardly spaced from the first enlargement 56 extend orthogonally between the walls 50 of the adaptor at one end thereof diagonally opposite the second slot 60. The abutment surfaces 78, 80 curve towards each other at a forward end of the adaptor drawn to the left of the drawing (FIG. 1) and are joined to define a smoothly contoured surface which will nest in the crook of the arm 20 when the arm 20 is moved longitudinally between the walls 50 of the adaptor as indicated by arrow 82 in FIG. 3 and arrow 83 in FIG. 2.

It will be noted from FIG. 2 that the transverse portion 27 of the arm 20 is accomodated in the adaptor 24 by forming one of the walls 50 with a reduced height at the back of the adaptor (drawn to the right) and adjacent a tab 88 cantilevered from the upper abutment surface 78 and described in more detail below with reference to the bayonet style of arm 22. The wall portion of reduced height is generally indicated by reference numeral 51.

The abutment surfaces 78, 80 are adapted to be received between the legs 30, 31 of the arm. A pair of shoulders 84 extending longitudinally on opposite sides on the upper abutment surface 78 adjacent the associated walls 50 of the adaptor is provided to increase the effective separation between the upper and lower abutment surfaces so that it corresponds to the distance x indicated by arrow 32, being the separation between the legs 30, 31. Thus, by nesting firmly between the legs 30, 31 there is no upward relative movement between the abutment surfaces 78, 80 of the adaptor 24 and the arm 20. Similarly, the separation between the walls 50 of the adaptor which extend upwardly a short distance above the upper abutment surface 78 is selected to correspond to the width of the legs 30 to constrain lateral relative movement between the arm 20 and the adaptor 24.

It will be understood that the separation between the lower abutment surface 80 and the first enlargement 56 is sufficient to accomodate the lower leg 25, 31 and to permit installation of the arm 23, 20 on the adaptor 24 in the pre-assembled position illustrated in FIG. 3. The lower abutment surface 80 and the web 52 also define a passage which receives the lower leg 25, 31.

Having reference particularly to the second variant 23 of the shepherd's crook style arm, the thickness of the stubs 42 is selected to at most equal the thickness of the walls 50 so that the separation between the stubs 42 is sufficient to accomodate the width of the lower leg 25 without any interference therebetween when the adaptor 24 is pushed downwardly into the yoke 26 as indicated by arrow 86 in FIG. 4 into the fully assembled position.

A third component of the first coupling means adapted to couple the bayonet style arm 22 to the yoke 26 comprises a tab 88 cantilevered from the upper abutment 78 at the back end of the adaptor 24 (drawn to the right in FIG. 1). The tab 88 has an aperture 90 whereby the tab is adapted to snap into engagement with the nib 34 upon forward relative movement of the arm 22 toward the adaptor as indicated by arrow 92. The operatively lower surface of the tab 88 has a ramp 94 for guiding the nib 34 towards engagement in the aperture 90. To constrain relative lateral movement between the arm 22 and the adaptor 24, a socket 96 is formed in the adaptor 24 which is defined at the upper end by the tab 88, at the sides by the walls 50, and at the bottom by a transversely extending web portion 98 orthogonal to the walls 50 and adjacent the undercut 68.

The assembly is completed by first positioning the adaptor 24 in the pre-assembled position of FIG. 3 where it is ready to receive the arm 22 and thereafter pushing downwardly on the adaptor so that it can assume the fully assembled position as illustrated in FIG. 5.

Finally, the adaptor 24 is provided with a pair of notches 100 extending downwardly from the web 52 and through the walls 50 of the adaptor. The notches 100 open at the bottom of the adaptor are separated by a longitudinally extending web 102. These notches 100 are adapted to engage on a conveyor carrying the adaptors in mass production assembly operations and may be provided on an optional basis for sorting operations to separate adaptors 24 dimensioned to accomodate small diameter pins from adaptors 69 dimensioned to accomodate large diameter pins.

It will also be appreciated that the pre-assembled (FIG. 2) and fully assembled (FIG. 3) positions of the adaptor are very advantageous to the original equipment manufacturer assembling arms to wiper superstructures on a mass production basis, since the adaptors can all be pre-assembled on the yokes before attachment to the wiper arms which will normally have already been installed on the motor vehicle for which the wiper is destined. Moreover, the attachment of the wiper arm to the adaptor and yoke assembly is very simple and requires no complex manipulation of clips or springs to engage in the groove 38 in the case of a side pin style arm 28 or complex manoeuvring of the wiper arm into the yoke in the case of a shepherd's crook style arm 20. Once the arm is positioned into the adaptor and yoke assembly, only a simple downward push on the adaptor is required to bring it to the fully assembled position.

The adaptor according to the invention does not require any separate tab portion or projection for engaging an aperture 104 (see FIG. 3) normally provided in shepherd's crook style arms in order to secure this style arm into the assembly for this purpose. With the adaptor according to the invention, no such aperture 104 is required and therefore the expense associated with punching the aperture and also the problems associated with centering and positioning the aperture relative to the operatively lower leg 31 are avoided. Without the need to provide such an aperture, the length of the operatively lower leg 31 on a shepherd's crook style arm 20 may also be shorter such that it will not traverse the slot 54 of the the adaptor when it is assembled with same. In such a case, the associated primary yoke 26 could have transversely extending support means in the form of a pin or rod replacing the stubs 42.

It will also be appreciated that the side pin style arm 28 is firmly locked in position by the adaptor 24 in the yoke 26 and will not rotate relative to the yoke because the adaptor is fixed to the yoke in two spaced locations, namely at the stubs 42 and at the pin 36.

The invention thus provides an adaptor which is a simple expedient for connecting a windshield wiper yoke to a variety of styles of wiper arms and also simplifies mass assembly operations.

As indicated above, several variations may be made to the above described embodiments of the invention without departing from the scope of the appended claims.

I claim:

1. In an adaptor and windshield wiper assembly wherein a windshield wiper superstructure comprises a primary yoke having a pair of spaced substantially parallel walls on a portion of its length supporting therebetween transversely extending support means which slidably receive the adaptor, the improvement wherein the adaptor has first coupling means receiving and retaining a free end of a wiper arm and second coupling means securing the adaptor to the primary yoke, said second coupling means comprising a pair of transversely spaced walls connected by a web extending therebetween, the spacing between the walls of the adaptor being selected to allow the adaptor to be inserted between said parallel walls of the yoke, and the walls of the adaptor each having a first downwardly extending slot having a bottom end and a top end whereby the adaptor engages said support means upon downward relative movement of the adaptor into the yoke, the first slots each having first and second enlargements longitudinally spaced from each other between said ends, the first enlargement being spaced from the bottom end to retain the adaptor on said support means in a pre-assembled position with the adaptor partially inserted in the yoke such that the resulting yoke and adaptor assembly is disposed to receive a free end of a wiper arm, and the second enlargement being spaced from the top end to retain the adaptor on the support means in a fully assembled position with the adaptor fully inserted in the yoke such that the wiper arm is secured to the yoke.

2. Assembly according to claim 1 in which the yoke further includes a pair of oppositely located apertures downwardly spaced from said support means and receiving therethrough a pin of a side pin style of wiper arm having a circumferential groove between its ends, said first coupling means comprising a pair of oppositely directed shoulders provided on spaced parallel sides extending transversely between the walls of the adaptor, and the shoulders locating in said circumferential groove in the fully assembled position of the adaptor upon downward relative movement of the adaptor over the pin.

3. Assembly according to claim 2 in which said apertures are longitudinally spaced from said support means and the sides traversing the adaptor terminate adjacent a second downwardly extending slot provided in each of the walls of the adaptor, the second slots being parallel to the first slots and terminating in a third enlargement adapted to retain the pin and spaced from the bottom of the adaptor so that the separation of the third enlargement from the apertures in the pre-assembled position of the adaptor corresponds to the separation between the first and second enlargements provided on the first slots.

4. Assembly according to claim 1 in which said first coupling means receives a free end of a shepherd's crook style of wiper arm having a U-shaped end defined by an operatively upper and operatively lower leg which are substantially parallel and separated by a predetermined distance x, said first coupling means comprising substantially parallel upper and lower abutment surfaces upwardly spaced from the first enlargement on the first slots and extending between the walls of the adaptor, the abutments being received between the legs of the arm upon relative longitudinal movement of the arm and the adaptor such that the operatively lower leg lies above the first enlargement of the slots thereby permitting the arm to be installed on the adaptor in the pre-assembled position of the adaptor, the effective separation between said abutment surfaces being selected to correspond to said separation x between the legs to constrain upward relative movement between the arm and the adaptor, and the effective separation between the walls of the adaptor being selected to correspond to the width of the legs to constrain lateral relative movement between the arm and the adaptor, continued relative longitudinal movement between the arm and the adaptor being arrested by the abutments meeting against the U-shaped end of the arm.

5. Assembly according to claim 4 in which the support means on the primary yoke comprises a pair of oppositely directed stubs separated by a distance which is at least equal to the width of the legs so that a shepherd's crook style of wiper arm of which the operatively lower leg is long enough to traverse the first slots will not interfere with the support means upon downward relative movement of the adaptor in the yoke.

6. Assembly according to claim 2 in which said first coupling means includes means to receive a free end of a shepherd's crook style of wiper arm having a U-shaped end defined by an operatively upper and operatively lower leg which are substantially parallel and separated by a predetermined distance x, said means comprising substantially parallel upper and lower abutment surfaces upwardly spaced from the first enlargement on the first slots and extending between the walls of the adaptor, the abutments being received between the legs of the shepherd's crook style of wiper arm upon relative longitudinal movement of the arm and the adaptor such that the operatively lower leg lies above the first enlargement of the slots thereby permitting the arm to be installed on the adaptor in the pre-assembled position of the adaptor, the effective separation between said abutment surfaces being selected to correspond to said separation x between the legs to constrain upward relative movement between the arm and the adaptor, and the effective separation between the walls of the adaptor being selected to correspond to the width of the legs to constrain lateral relative movement between the arm and the adaptor, continued relative longitudinal movement between the arm and the adaptor being arrested by the abutments meeting against the U-shaped end of the arm.

7. In an adaptor and windshield wiper assembly wherein a windshield wiper superstructure comprises a primary yoke having a pair of spaced substantially parallel walls on a portion of its length supporting therebetween transversely extending support means which slidably receive the adaptor, the yoke further including a pair of oppositely located apertures downwardly and longitudinally spaced from said support means and receiving therethrough a pin of a side pin style of wiper arm having a circumferential groove between its ends, the improvement wherein the adaptor has first coupling means receiving and retaining the pin and second coupling means securing the adaptor to the primary yoke in either a pre-assembled position or a fully assembled position;

the adaptor comprising a pair of transversely spaced walls connected by a web extending therebetween, the spacing between the walls of the adaptor being selected to allow the adaptor to be inserted between said parallel walls of the yoke, said second coupling means comprising a first downwardly extending slot having a bottom end and a top end provided on each of the walls of the adaptor whereby the adaptor engages said support means upon downward relative movement of the adaptor into the yoke, the first slots each having first and second enlargements longitudinally spaced from each other between said ends, the first enlargement being spaced from the bottom end to retain the adaptor on said support means in a pre-assembled position with the adaptor partially inserted in the yoke such that the resulting yoke and adaptor assembly is disposed to receive a free end of a wiper arm, and the second enlargement being spaced from the top end to retain the adaptor on the support means in a fully assembled position with the adaptor fully inserted in the yoke such that the wiper arm is secured to the yoke; and said first coupling means comprising a pair of oppositely directed shoulders locating in said circumferential groove of the pin and provided on spaced parallel sides extending transversely between the walls of the adaptor, the sides terminating adjacent a second downwardly extending slot provided in each of the walls of the adaptor, the second slots each being parallel to the first slots and terminating in a third enlargement adapted to retain the pin in the fully assembled position, the third enlargement being spaced from the bottom of the adaptor so that the separation of the third enlargement from the apertures in the pre-assembled position of the adaptor corresponds to the separation between the first and second enlargements provided on the first slots.

8. Assembly according to claim 7 in which said first coupling means includes means to receive a free end of a shepherd's crook style of wiper arm having a U-shaped end defined by an operatively upper and operatively lower leg which are substantially parallel and separated by a predetermined distance x, said means comprising substantially parallel upper and lower abutment surfaces upwardly spaced from the first enlargement on the first slots and extending between the walls of the adaptor, the abutments being received between the legs of the shepherd's crook style of wiper arm upon relative longitudinal movement of the arm and the adaptor such that the operatively lower leg lies above the first enlargement of the slots thereby permitting the arm to be installed on the adaptor in the pre-assembled position of the adaptor, the effective separation between said surfaces being selected to correspond to said separation x between the legs to constrain upward relative movement between the arm and the adaptor, and the effective separation between the walls of the adaptor being selected to correspond to the width of the legs to constrain lateral relative movement between the arm and the adaptor, continued relative longitudinal movement between the arm and the adaptor being arrested by the abutments meeting against the U-shaped end of the arm.

9. Assembly according to claim 8 in which the support means on the primary yoke comprises a pair of oppositely directed stubs separated by a distance which is at least equal to the width of the legs so that a shepherd's crook style of wiper arm of which the operatively lower leg is long enough to traverse the first slots will not interfere with the support means upon downward relative movement of the adaptor in the yoke.

10. Assembly according to claim 9 in which said first coupling means is also adapted to receive the free end of a bayonet style of wiper arm having an upwardly projecting nib, the first coupling means comprising a tab cantilevered from the upper abutment surface between the walls of the adaptor and having an aperture whereby the tab is adapted to snap into engagement with the nib.

* * * * *